2,883,372
COPOLYMERS OF ETHYLENE AND DIHYDRO-DICYCLOPENTADIENE

Gelu Stoeff Stamatoff, Newark, Del., assignor to E. I. du Pont de Nemours and Company, Wilmington, Del., a corporation of Delaware No Drawing. Application March 14, 1957
Serial No. 645,920

2 Claims. (Cl. 260—88.1)

This invention relates to novel hydrocarbon polymers and in particular, to interpolymers of ethylene and tricyclic olefins.

High molecular weight, solid hydrocarbon polymers have been known in the art for a considerable length of time. These polymers although useful for many purposes, are, in general, plastics which have relatively low softening points and are either very flexible and tough, or rigid and brittle. The mechanical properties of the polymer decrease rapidly with increasing temperatures. It has been the goal for many years to prepare high molecular weight, solid hydrocarbon polymers which combine toughness with rigidity and which have a reasonable retention of these properties at elevated temperatures.

It is therefore the objective of the present invention to prepare novel, solid hydrocarbon polymers. A further objective is to prepare solid interpolymers of ethylene and tricyclic olefins. Another object is to prepare solid hydrocarbons with high toughness. Still another object is to prepare hydrocarbon polymers which combine high rigidity with high toughness.

In accordance with the present invention highly useful hydrocarbon resins are obtained when tricyclic monoolefins are copolymerized with ethylene.

In one embodiment of the present invention, high molecular weight copolymers of ethylene and 2,3-dihydrodicyclopentadiene having the general formula:

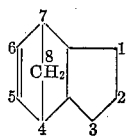

which on fabrication have a combination of high rigidity and high toughness are obtained when a monomer mixture of the two components is contacted with a "coordination" catalyst, preferably in the presence of a solvent.

The "coordination" catalysts employed to prepare the products of the present invention are generally obtained by admixing a transition metal halide or a mixture of transition metal halides with a metal alkyl or a mixture of metal alkyls. The catalyst is formed as a result of a reaction of the transition metal halide with the metal alkyl leading to the formation of a catalytically active complex containing the transition metal in a reduced valence state. This complex is believed to coordinate with ethylenically unsaturated monomers and thereby cause the polymerization of the ethylenically unsaturated monomers. Preferred transition metal halides are the halides of titanium, zirconium, vanadium, chromium, tungsten, and molybdenum and particularly the chlorides thereof. Preferred metal alkyls are aluminum alkyls, alkali metal aluminum alkyls, magnesium alkyls and aryls, zinc alkyls and tin alkyls. Metal hydrides and active metals may also be employed as reducing agents.

The polymeric products obtained by the process of the present invention are distinguished from polymers obtained from the copolymerization of ethylene and substituted bicycloheptenes with coordination catalysts by their greatly improved rigidity and toughness, as well as the retention of these properties at elevated temperatures. Exceedingly useful polymers are also obtained when small amounts of the tricyclic olefins are copolymerized with ethylene. Minor amounts of the tricyclic olefin in the polyethylene chain have been found to cause a surprising increase in toughness of the polymer without adversely affecting other properties of polyethylene.

The formation of the ethylene 2,3-dihydrodicyclopentadiene copolymers employing a coordination catalyst can be carried out under extremely mild conditions, namely at room temperature and atmospheric pressure. However, if desired, superatmospheric pressures and elevated temperatures may be employed. The polymerization is generally carried out in the presence of an inert hydrocarbon solvent such as cyclohexane, n-heptane, xylene, or decahydronaphthalene. In polymerizing the monomers of the present inveniton the reaction takes place most satisfactorily in the absence of moisture and in the absence of other sources of hydroxyl groups, since these compounds tend to destroy the reactivity of the catalyst. The catalyst may be prepared prior to use in the polymerization or the catalyst components may be admixed in the presence of the monomer. The catalyst components may be admixed in a wide range of proportions to form the catalyst. The best results are obtained when a molar ratio of metal alkyl to transition metal halide varying from 1 to 5 is employed. The quantity of the catalyst can also be varied greatly, but is generally employed in a range of 0.001 to 1.0% by weight of the monomers.

The ratio of the monomers in the copolymer depends on the ratio of the monomers dissolved in the inert reaction medium. Since ethylene usually has a much faster rate of polymerization this must be accounted for in the ratio of the monomers added to the polymerization mixture.

The properties of the copolymers of the present invention vary with the composition of the copolymer. In general both melting point and rigidity of the copolymer increase as the 2,3-dihydrodicyclopentadiene content in the copolymer is increased as indicated by increasing density of the copolymer. Tough copolymers with increasing rigidity may be prepared over a wide range of monomer ratios. Copolymers containing about 20 to 30 weight percent of the tricyclic olefin have flexural moduli of 2.6 to $3.1 \times 10^5$ p.s.i. As shown by the examples even higher flexural moduli can be obtained at higher concentrations of the tricyclic olefin. At very low concentrations of the 2,3-dihydrodicyclopentadiene in the copolymer, i.e., below 5 percent, the copolymer properties are markedly different from copolymer properties obtained with copolymers having greater than 10 percent of the tricyclic olefin in the copolymer. At these very low concentrations the stiffness of the copolymer is reduced below that of polyethylene, but the toughness of the copolymer is significantly increased. These low concentration copolymers are ideally suited for the preparation of exceedingly tough films. The copolymers of ethylene and 2,3-dihydrodicyclopentadiene prepared by the methods described herein are high molecular weight solid copolymers which can be melt extruded and molded into tough films and drawable fibers. Solution viscosity measurements of the copolymer in 0.1% concentrations in decahydronaphthalene at 150° C. show that the copolymers usually have inherent viscosities above 1.0.

The preparation of ethylene is well known in the art and is for that reason not described. 2,3-dihydrodicyclopentadiene may be prepared in various ways. In a preferred method, 2,3-dihydrodicyclopentadiene is prepared from cyclopentadiene and cyclopentene by a Diels-Alder addition reaction in which cyclopentadiene is heated with a sixfold excess of cyclopentene to a temperature of 200° C. for a period of 7 hours in the absence of oxygen. Substituted 2,3-dihydrodicyclopentadienes may similarly be employed in the polymerization with ethylene to obtain polymeric products similar to the copolymers of the present invention. Such substituted 2,3-dihydrodicyclopentadienes are similarly prepared from substituted cyclopentadiene and substituted cyclopentenes. Substitution is, however, limited to the 1, 2, 3, 4 and 7 position, otherwise substitution will interfere in the formation of the monomer by the Diels-Alder reaction or in the polymerization of the monomer.

In addition to the tricyclic olefins obtained from the addition of cyclopentene to cyclopentadiene, similar tricyclic olefins obtained by the addition of cyclobutene and cyclohexene to cyclopentadiene may be employed to form copolymers of the present invention.

The invention is further illustrated by the following examples:

Example I

Into a 1-l. three-necked round bottom flask, equipped with stirrer, gas inlet and outlet means, dropping funnel and a reflux condenser was charged under nitrogen 500 g. of cyclohexane, 35 g. of 2,3-dihydrodicyclopentadiene and 0.01 mole of aluminum triisobutyl. The nitrogen was then replaced with ethylene at atmospheric pressure and the reaction mixture was agitated to form a saturated solution of ethylene. The polymerization was then initiated by the injection of 0.005 mole of titanium tetrachloride. The polymerization was continued for one hour while replenishing the ethylene polymerized and maintaining the ethylene in the reaction vessel at atmospheric pressure. No external heating was applied but the reaction temperature rose to a maximum of 50° C. during the polymerization. The reaction mixture was poured into excess methanol and filtered. On further washing and drying 41 g. of a copolymer of 2,3-dihydrodicyclopentadiene and ethylene was obtained. The copolymer was soluble in decahydronaphthalene at 150° C. Tough and stiff clear films could be compression molded from the polymer. The density of the polymer was 1.016. The flexural modulus of a film sample of the copolymer was measured to be 424,000 p.s.i. at 23° C.

Example II

Ethylene and 2,3-dihydrodicyclopentadiene were continuously polymerized in a reactor system comprising a 500 ml. stainless steel autoclave equipped with a stirrer, heater and inlet and outlet valves. Monomers and catalyst components dissolved in the polymerization medium were continuously charged to the autoclave from the respective storage containers through accurate metering and proportioning pumps, and copolymer slurry was continuously removed. The autoclave was maintained at a pressure of 1500 p.s.i. and a temperature of 100° C. after equilibrium conditions had been obtained by feeding solvent catalyst and monomer. A solution of 8.6 g. of ethylene in 450 ml. of cyclohexane was introduced into the reactor at the rate of 7.5 ml./minute, simultaneously with a 0.2 molar solution of titanium tetrachloride in cyclohexane at the rate of 2 ml./minute and a solution of 56 g. of 2,3-dihydrodicyclopentadiene and 0.04 mole of aluminum triisobutyl in 250 ml. cyclohexane at a rate of 3 ml./minute. The addition was continued for a period of one hour. Polymer slurry was removed from the reaction at the rate necessary to maintain pressure in the reactor at the desired level. The polymer slurry was continuously poured into n-butanol to deactivate the catalyst. The slurry was filtered and the polymer obtained washed with methanol to remove catalyst residues. On drying 8 g. of a solid copolymer of ethylene and 2,3-dihydrodicyclopentadiene was obtained. The copolymer could be molded into stiff, tough films at a temperature of 200° C. and a pressure of 30,000 pounds. The density of the polymer was found to be 0.980.

Example III

Employing the procedure described in Example II an ethylene, 2,3-dihydrodicyclopentadiene copolymer was prepared at a reaction temperature of 86° C. and at a higher ethylene concentration of 10.7 g. in 450 ml. of cyclohexane, and under otherwise identical conditions. A copolymer with a high ethylene content having a density of 0.958 was obtained. The copolymer could be molded into tough, flexible films having a stiffness of 65,000 p.s.i. at 23° C.

The copolymers of the present invention combine high rigidity with high toughness. They may be fabricated into articles, films, and fibers. The copolymers may be blended with other thermoplastic polymers. Fillers, reinforcing agents, such as fibrous materials, and foaming agents may be added to the copolymers to serve particular applications. The properties of the copolymers may further be improved by the addition of stabilizing agents and pigments may be added to obtain colored compositions.

The copolymers of the present invention are useful for a large number of applications, particularly those which require a material of high rigidity and toughness and those which require a material with a high degree of toughness as in film applications.

I claim:

1. A normally solid copolymer of 2,3-dihydrodicyclopentadiene and ethylene, said copolymer having a density in the range of 0.96 to 1.02 and capable of being compression molded at elevated temperatures into tough films.

2. A normally solid copolymer of 2,3-dihydrodicyclopentadiene and ethylene containing less than 50 mol percent of the 2,3-dihydrodicyclopentadiene, said copolymer having an inherent viscosity of greater than 1.0 as measured at 150° C. by a 0.1% solution of the polymer in decahydronaphethalene and capable of being compression molded at elevated temperatures into tough films.

References Cited in the file of this patent

UNITED STATES PATENTS

| | | |
|---|---|---|
| 2,699,457 | Ziegler et al. | Jan. 11, 1955 |
| 2,773,051 | Leary | Dec. 4, 1956 |